United States Patent

Porter et al.

[15] 3,640,484
[45] Feb. 8, 1972

[54] RELEASE MECHANISM

[72] Inventors: Harry B. Porter, Lancaster; Robert A. Weinhardt, China Lake, both of Calif.

[73] Assignee: The United States of America as represented by the Secretary of the Navy

[22] Filed: May 4, 1970

[21] Appl. No.: 34,033

[52] U.S. Cl. ....................................................244/3.21
[51] Int. Cl. ...................................................F42b 15/02
[58] Field of Search ......................................244/3.21

[56] References Cited

UNITED STATES PATENTS

| | | | |
|---|---|---|---|
| 2,775,202 | 12/1956 | Crockett | 244/3.21 |
| 2,935,947 | 5/1960 | Jagiello | 244/3.21 |
| 3,285,536 | 11/1966 | Donaldson | 244/3.21 |

*Primary Examiner*—Verlin R. Pendegrass
*Attorney*—R. S. Sciascia and Roy Miller

[57] ABSTRACT

A release mechanism for stabilizing rollerons of a missile. The device comprises a cager of a bar magnet fixed in a slot in the wing of a missile adjacent the rollerons. The cager is shaped and secured so that its inertia causes it to rotate toward the rear when the missile is accelerated forward. In the caged position one end of the cager fits in a recess provided in a nonmagnetic rolleron housing thereby preventing movement of the rolleron relative to the wing. Magnetic attraction between the cager and an iron member mounted on the edge of the rolleron housing holds the cager in position until the setback force on the cager exceeds the magnetic force between the bar and said iron member. The bar then moves back into position in the wing slot and is held there by the magnetic attraction of another iron member positioned in the top wall of said slot.

2 Claims, 2 Drawing Figures

PATENTED FEB 8 1972

3,640,484

INVENTORS.
HARRY B. PORTER
ROBERT A. WEINHARDT
BY
ROY MILLER
ATTORNEY.

RELEASE MECHANISM

GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a release mechanism for initiating mechanical action at a predetermined acceleration; more particularly, a cager for stabilizing rollerons of a missile.

In various missile systems the "sliding slug" rolleron-caging mechanism is used. The chief disadvantages of this type cager are that dust and moisture can enter the clearance between the slug and wing hole, also mechanical interference or freezing can cause undue variations in the force of gravity $g$ values to unlock. The present device produces little friction and is not likely to be adversely affected by dust particles of a size that could gain entrance. The overall simplicity of this invention makes it less costly to manufacture.

DESCRIPTION OF THE PREFERRED EMBODIMENT

Figure 1:
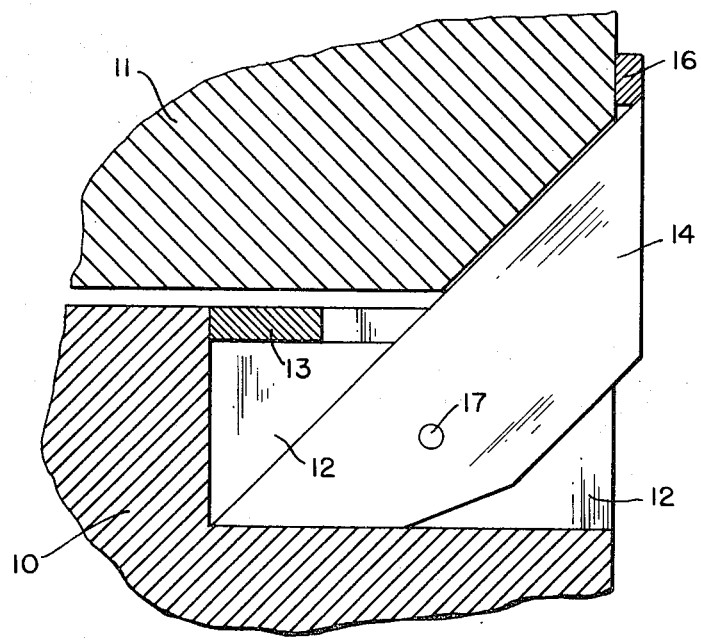
FIG. 1 is an enlarged section through the wing and rolleron for a rocket propelled missile, illustrating an application of the instant invention in caged position.
Figure 2:
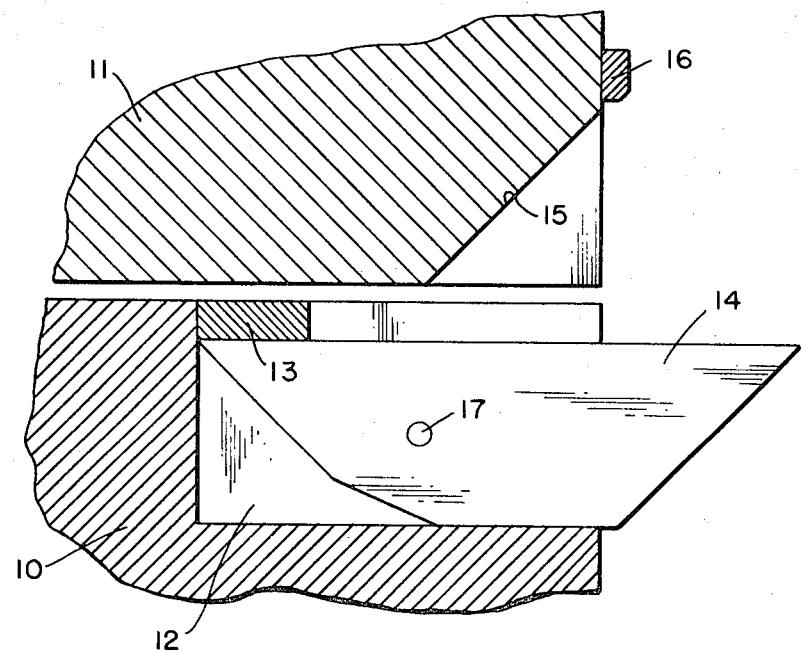
FIG. 2 is an enlarged section through the wing and rolleron for a rocket propelled missile, illustrating application of the instant invention in an uncaged position.

Referring now to the drawing there is shown in FIG. 1 a portion of a rocket missile wing 10 which serves to stabilize the missile in flight. The aft portion of wing 10 is provided with a cutout in which is mounted a rolleron housing 11 shown in partial section. Rollerons are pivotally secured to the missile wings and are each generally stabilized by a gyro of suitable design (not shown). In the event the missile starts to roll during flight the rollerons are caused to pivot out of line with the wings or fins to present an aerodynamic surface to the airstream for forcing the missile to right itself. In accordance with this invention there is provided adjacent rolleron housing 11, a slot 12 in wing 10, a first iron member 13 mounted in the top of slot 12 as shown and a release mechanism or cager 14 of a suitable shape pivotally affixed by a loose-fitting pin 17 within said slot 12. Cager 14 comprises a bar magnet sized and shaped to move within said slot and secured by pivot pin 17 in said slot so that its inertia causes it to tend to rotate toward the rear of slot 12 when the missile is accelerated forward. In the caged position as shown in FIG. 1 the after end of said cager 14 fits in a cutout section 15 shown in FIG. 2 provided in the nonmagnetic rolleron housing 11 thereby preventing movement of the rolleron relative to the wing. A second iron member 16 mounted on the outside of said rolleron housing 11 adjacent the top edge of cutout section 15 holds cager 14 in position by magnetic attraction until the setback force on the cager 14 (due to acceleration of the vehicle) exceeds the magnetic force between cager 14 and second iron member 16. In the uncaged position as shown in FIG. 2 the front end of cager 14 is held in position in wing slot 12 by the magnetic attraction between the cager and first iron member 13 until deliberately forced to the caged position.

The attractive force between the iron member 16 and cager 14 and hence the acceleration required to actuate cager 14 can be varied by changing the size, shape, or position of the iron members, or by coating either the iron member 16 or cager 14, or both, with different thicknesses of nonmagnetic material. Various materials which can be magnetized are obviously suitable for forming the present invention.

In operation, at a predetermined acceleration, cager 14 is pulled away from second iron member 16 and rotates out of the cutout section 15 in the rolleron housing 11. At the end of its rotation, cager 14 contacts first iron member 13, which is mounted in slot 12 located in wing 10, and is held in the uncaged position until it is deliberately forced into the caged position.

Cager 14 formed of iron and member 13 and 16 formed of a bar magnet will produce the same effect as the embodiment described hereinabove.

The loose-fitting pivot pin which holds the cager in place in the wing slot involves an exceedingly small sliding surface, which produces very little friction and is not likely to be adversely affected by dust particles of a size that could gain entrance.

What is claimed is:

1. A device for initiating mechanical action on the rollerons which are pivotally coupled to missile wings which comprises in combination
   a cager comprising a bar magnet of predetermined shape and dimensions;
   a slot of dimensions sufficient to contain said cager provided in each of said wings of said missile and positioned so as to extend parallel with each of said rollerons;
   a first member comprised of iron mounted in the top of said slot which holds said cager in a stable position;
   said cager being pivotally secured in said slot in such a manner that its inertia causes it to rotate toward the rear of the slot when said missile is accelerated forward;
   a cutout section provided on the aft portion of said rolleron; and
   a second member comprised of iron mounted at the top edge of said cutout section whereby said cager is held in a caged position by magnetic attraction until the setback force on said cager exceeds the force between said cager and said second iron member whereby the bar returns to said slot.

2. The device in accordance with claim 1 wherein said cager consists of iron and said members consist of a bar magnet.

* * * * *